United States Patent
Wrobel et al.

(10) Patent No.: US 11,549,883 B2
(45) Date of Patent: Jan. 10, 2023

(54) SENSING OF MARKERS FOR AIRBORNE PARTICULATE POLLUTION BY WEARABLE COLORIMETRY

(71) Applicant: LogicInk Corporation, San Francisco, CA (US)

(72) Inventors: Steven Wrobel, Oakland, CA (US); Peter Foller, San Franciso, CA (US)

(73) Assignee: LOGICINK CORPORATION, San Francisco, CA (US)

( * ) Notice: Subject to any disclaimer, the term of this patent is extended or adjusted under 35 U.S.C. 154(b) by 0 days.

(21) Appl. No.: 16/639,028

(22) PCT Filed: Aug. 17, 2018

(86) PCT No.: PCT/US2018/000307
§ 371 (c)(1),
(2) Date: Feb. 13, 2020

(87) PCT Pub. No.: WO2019/036022
PCT Pub. Date: Feb. 21, 2019

(65) Prior Publication Data
US 2020/0363322 A1  Nov. 19, 2020

Related U.S. Application Data
(60) Provisional application No. 62/546,860, filed on Aug. 17, 2017.

(51) Int. Cl.
*G01N 21/29* (2006.01)
*G01N 21/78* (2006.01)
(Continued)

(52) U.S. Cl.
CPC ........... *G01N 21/293* (2013.01); *G01N 21/78* (2013.01); *G01N 31/22* (2013.01); *G01N 2021/7796* (2013.01)

(58) Field of Classification Search
CPC .... G01N 31/229; G01N 21/78; G01N 21/783; G01N 31/224; G01N 2201/0221;
(Continued)

(56) References Cited

U.S. PATENT DOCUMENTS

| 3,482,944 A | 12/1969 | Plantz et al. |
| 3,748,096 A | 7/1973 | Schmitt et al. |

(Continued)

FOREIGN PATENT DOCUMENTS

| CN | 106483072 A | * | 3/2017 | ............. G01N 21/59 |
| GB | 2528492 A | | 1/2016 | |

(Continued)

OTHER PUBLICATIONS

Air Quality Index (AQI), https://www.airnow.gov/aqi/, last retrieved from the Internet Oct. 5, 2021 (3 pages).
(Continued)

*Primary Examiner* — Michael P Stafira
(74) *Attorney, Agent, or Firm* — Wilmer Cutler Pickering Hale and Dorr

(57) ABSTRACT

A wearable pollutant indicator, methods of making and using same. The indicator includes a polymeric film substrate having a first side and a second side, an adhesive disposed on the first side of the substrate, and a readily understood user interface disposed on the second side of the substrate, wherein the user interface comprises a qualitative indicator of the accumulated exposure to incident airborne particulate pollution as sensed through the reaction of the transition metal oxides therein.

22 Claims, 7 Drawing Sheets

Stack-up of Applique

(51) Int. Cl.
*G01N 31/22* (2006.01)
*G01N 21/77* (2006.01)

(58) Field of Classification Search
CPC ............ G01N 27/4145; G01N 33/497; G01N
21/8422; G01N 33/0047; G01N
2015/0038; G01N 21/21; G01N 21/80;
G01N 27/4148; G01N 15/06; G01N
21/8483; G01N 2333/35; G01N 33/0049;
G01N 33/0055; G01N 33/54313; G01N
2021/7796; G01N 21/293; G01N
2800/12; G01N 31/22; G01N 33/0009;
G01N 33/02; G01N 33/52; G01N 33/574;
G01N 33/57423; G01N 27/4141; G01N
27/4146; G01N 31/228; G01N 33/53;
G01N 33/54373; G01N 33/587; G01N
33/6845; G01N 2015/149; G01N 21/25;
G01N 21/253; G01N 21/554; G01N
21/82; G01N 33/543; G01N 33/54386;
G01N 21/03; G01N 21/05; G01N
21/6428; G01N 21/9508; G01N 27/302;
G01N 27/414; G01N 33/0031; G01N
33/5438; G01N 1/02; G01N 15/14; G01N
15/1468; G01N 2001/002; G01N
2001/028; G01N 2015/1497; G01N
2021/6439; G01N 2021/6471; G01N
2021/7763; G01N 2021/7786; G01N
2021/7793; G01N 2021/8887; G01N
2033/4975; G01N 2035/00752; G01N
21/17; G01N 21/31; G01N 21/3554;
G01N 21/55; G01N 21/77; G01N
21/8851; G01N 21/9036; G01N 21/9045;
G01N 21/94; G01N 2201/024; G01N
27/041; G01N 27/043; G01N 27/12;
G01N 27/3272; G01N 27/447; G01N
30/0005; G01N 33/004; G01N 33/0057;
G01N 33/56983; G01N 33/585; G01N
33/66; G01N 33/94; G01N 35/00732;
G01N 15/0266; G01N 15/1429; G01N
15/1459; G01N 15/1475; G01N
2015/0288; G01N 2015/1486; G01N
2015/1488; G01N 2015/1493; G01N
2021/0112; G01N 2021/174; G01N
21/01; G01N 21/255; G01N 21/29; G01N
21/33; G01N 21/3577; G01N 21/359;
G01N 21/47; G01N 21/59; G01N 21/643;
G01N 21/645; G01N 21/6452; G01N
21/648; G01N 21/7703; G01N 2201/066;
G01N 2201/067; G01N 2201/13; G01N
2333/165; G01N 2333/195; G01N
2333/245; G01N 2333/31; G01N
2333/32; G01N 2333/33; G01N 2469/10;
G01N 27/00; G01N 27/04; G01N 27/07;
G01N 27/123; G01N 27/124; G01N
27/129; G01N 2800/26; G01N 33/0037;
G01N 33/483; G01N 33/48707; G01N
33/5005; G01N 33/5008; G01N 33/553;
G01N 33/56916; G01N 33/56938; G01N
33/56966; G01N 33/58; G01N 33/582;
G01N 27/30
See application file for complete search history.

(56) References Cited

U.S. PATENT DOCUMENTS

| | | | |
|---|---|---|---|
| 4,205,043 A | 5/1980 | Esch et al. | |
| 4,382,063 A | 5/1983 | Romito et al. | |
| 4,788,432 A | 11/1988 | Patel | |
| 5,192,500 A | 3/1993 | Treddenick | |
| 5,899,856 A | 5/1999 | Schoendorfer et al. | |
| 6,060,321 A | 5/2000 | Hovorka | |
| 6,251,083 B1 | 6/2001 | Yum et al. | |
| 6,267,724 B1 | 7/2001 | Taylor | |
| 6,706,099 B2 | 3/2004 | Sir et al. | |
| 6,773,671 B1 | 8/2004 | Lewis et al. | |
| 7,969,307 B2 | 6/2011 | Peeters | |
| 8,278,631 B2 | 10/2012 | Patel | |
| 8,663,998 B2 | 3/2014 | Heacock et al. | |
| 9,097,588 B2 | 8/2015 | Mills et al. | |
| 9,131,893 B2 | 9/2015 | Faybishenko et al. | |
| 9,133,024 B2 | 9/2015 | Phan et al. | |
| 9,532,762 B2 | 1/2017 | Cho et al. | |
| 9,658,101 B1 | 5/2017 | Levine et al. | |
| 10,195,294 B2 | 2/2019 | Tibbits et al. | |
| 10,485,426 B2 | 11/2019 | Liu et al. | |
| 2003/0211618 A1* | 11/2003 | Patel | A61L 2/28 436/38 |
| 2006/0206180 A1 | 9/2006 | Alcidi et al. | |
| 2007/0160814 A1 | 7/2007 | Mercolino | |
| 2008/0003687 A1 | 1/2008 | Satoh et al. | |
| 2008/0107699 A1 | 5/2008 | Spigelman et al. | |
| 2009/0050491 A1 | 2/2009 | Brown | |
| 2009/0128345 A1 | 5/2009 | Patel | |
| 2009/0325221 A1 | 12/2009 | Long et al. | |
| 2010/0140108 A1 | 6/2010 | Roblin et al. | |
| 2011/0106000 A1 | 5/2011 | Jones et al. | |
| 2011/0295091 A1 | 12/2011 | Azer et al. | |
| 2012/0137958 A1 | 6/2012 | Mills et al. | |
| 2012/0165626 A1 | 6/2012 | Irina et al. | |
| 2012/0187000 A1 | 7/2012 | Kahn et al. | |
| 2014/0154808 A1* | 6/2014 | Patel | G01K 3/04 436/1 |
| 2014/0209842 A1 | 7/2014 | Pagba et al. | |
| 2015/0087076 A1* | 3/2015 | Heacock | G01N 31/229 436/164 |
| 2015/0126834 A1 | 5/2015 | Wang et al. | |
| 2015/0359469 A1 | 12/2015 | Jacobs et al. | |
| 2016/0011157 A1* | 1/2016 | Smyth | G01N 31/229 422/426 |
| 2016/0320308 A1* | 11/2016 | Liss | G01N 31/223 |
| 2016/0339120 A1 | 11/2016 | Tibbits et al. | |
| 2017/0071536 A1 | 3/2017 | Tibbits et al. | |
| 2017/0186160 A1 | 6/2017 | Satish et al. | |
| 2017/0325737 A1 | 11/2017 | Olguin Alvarez et al. | |
| 2020/0022648 A1 | 1/2020 | Danino et al. | |
| 2020/0149960 A1 | 5/2020 | Foller et al. | |

FOREIGN PATENT DOCUMENTS

| | | |
|---|---|---|
| JP | S49-35712 | 9/1974 |
| JP | S51-133079 A | 11/1976 |
| JP | S55-113955 A | 9/1980 |
| JP | S61-008660 A | 1/1986 |
| JP | S62-64952 A | 3/1987 |
| JP | 2002-168790 A | 6/2002 |
| JP | 2004-257930 A | 9/2004 |

(56) References Cited

FOREIGN PATENT DOCUMENTS

| | | | | |
|---|---|---|---|---|
| JP | 2007-071549 A | 3/2007 | | |
| JP | 2010-520455 A | 6/2010 | | |
| JP | 2017-509731 A | 4/2017 | | |
| WO | WO-00/03226 A1 | 1/2000 | | |
| WO | WO-2002/094098 A1 | 11/2002 | | |
| WO | WO-2008106412 A1 | 9/2008 | | |
| WO | WO-2009/149308 A2 | 12/2009 | | |
| WO | WO-2010/010321 A1 | 1/2010 | | |
| WO | WO-2012/074509 A1 | 6/2012 | | |
| WO | WO-2015104399 A1 | 7/2015 | | |
| WO | WO-2015/159280 A1 | 10/2015 | | |
| WO | WO-2016/025468 A2 | 2/2016 | | |
| WO | WO-2016/090189 A1 | 6/2016 | | |
| WO | WO-2016102337 A1 * | 6/2016 | ........... | G01N 21/783 |
| WO | WO-2016105548 A1 * | 6/2016 | ....... | G01N 33/54373 |
| WO | WO-2017136336 | 8/2017 | | |
| WO | WO-2018/144627 A1 | 8/2018 | | |
| WO | WO-2018/0232387 A1 | 12/2018 | | |
| WO | WO-2019/036022 A2 | 2/2019 | | |

OTHER PUBLICATIONS

Barreira, Alexander, "UC Berkeley undergraduates develop wearable air-pollution monitor," The Daily Californian, Nov. 24, 2014, www.dailycal.org/2014/11/24/uc-berkeley-undergrads-developing-wearable-pollution-monitor/ (3 pages).

Central Air Monitor Controller, HAVEN, Sep. 2021, https://haveniaq.com/haven-products/ (4 pages).

Demitri, Christian, et al., "Novel Superabsorbent Cellulose-Based Hydrogels Crosslinked with Citric Acid," Journal of Applied PolymerScience, vol. 110, pp. 2453-2460, DOI: 10.1002/app. 28660, 2008 (8 pages).

Extended European Search Report and Search Opinion, dated Mar. 25, 2021, received in related European Patent Application No. 18846015.8 (12 pages).

Heller-Zeisler, Susan F., et al., "Collection and Characterization of a Bulk PM2.5 Air Particulate Matter Material for Use in Reference Materials," Biological Trace Element Research, vols. 71-72, pp. 195-202, 1999 (8 pages).

International Search Report and Written Opinion, dated Dec. 21, 2018, for International Application No. PCT/US2018/000307 (11 pages).

Marcy, A. Dale, et al., "Development of a field method for measuring manganese in welding fume," Medline database, US National Library of Medicine, Bethesda, MD, Database accession No. NLM 17968446, Abstract, Nov. 2007 (1 page).

Marcy, A. Dale, et al., "Development of a field method of measuring manganese in welding fume," Journal of Environmental Monitoring, vol. 9, No. 11, pp. 1199-1204, DOI: 10.1039/b705252a, Nov. 2007 (7 pages).

Rattanarat, Poomrat, et al., "A microfluidic paper-based analytical device for rapid quantification of particulate chromium," Analytical Chimica Acta, vol. 800, pp. 50-55, DOI: 10.1016/J.ACA.2013.09. 008, Sep. 12, 2013 (6 pages).

SRM Order Request System (SRMORS), National Institute of Standards and Technology, https://www-s.nist.gov/srmors/, last retrieved from the Internet Nov. 6, 2021 (2 pages).

Sun, Guojin, et al., Characterizing PM2.5 Pollution of a Subtropical Metropolitan Area in China, Atmospheric and Climate Sciences, vol. 3, pp. 100-110, DOI: 10.4236/acs.2013.31012, 2013 (11 pages). Office Action dated May 31, 2022 by Japanese Patent Office in Japanese Patent Application No. 2020-531428 with English translation (10 total pages).

Bartolo,D., et al. "Microfluidic Stickers," Lab Chip, vol. 8, pp. 274-279 (published online Nov. 22, 2007).

Bjerketorp, J., "Advances in preservation methods: keeping biosensor microorganisms alive and active," Current Opinion in Biotechnology, vol. 17, pp. 43-48 (available online Dec. 20, 2005).

Danino et al., "A synchronized quorum of genetic clocks," Nature, 2010, pp. 326-330, plus 9 pgs. of Supplementary Information, vol. 463 (14 pages).

U.S. Appl. No. 15/162,438 Final Office Action dated Jul. 11, 2017 (25 total pages).

U.S. Appl. No. 15/162,438 Office Action dated Apr. 10, 2018 (14 total pages).

U.S. Appl. No. 15/162,438 Office Action dated Jan. 23, 2017 (17 total pages).

U.S. Appl. No. 15/358,415 Final Office Action dated Apr. 9, 2018 (22 total pages).

U.S. Appl. No. 15/358,415 Final Office Action dated Aug. 23, 2019 (17 total pages).

U.S. Appl. No. 15/358,415 Final Office Action dated Mar. 11, 2020 (21 total pages).

U.S. Appl. No. 15/358,415 Final Office Action dated Mar. 29, 2019 (19 total pages).

U.S. Appl. No. 15/358,415 Final Office Action dated May 6, 2021 (25 total pages).

U.S. Appl. No. 15/358,415 Office Action dated Sep. 28, 2020 (21 total pages).

U.S. Appl. No. 15/358,415 Office Action dated Nov. 2, 2018 (22 total pages).

U.S. Appl. No. 15/358,415 Office Action dated Sep. 19, 2017 (15 total pages).

U.S. Appl. No. 15/451,065 Final Office Action dated Feb. 11, 2020 (13 total pages).

U.S. Appl. No. 15/451,065 Final Office Action dated Mar. 11, 2021 (12 total pages).

U.S. Appl. No. 15/451,065 Office Action dated Aug. 14, 2020 (13 total pages).

U.S. Appl. No. 15/451,065 Office Action dated Jul. 2, 2021 (11 total pages).

U.S. Appl. No. 15/451,065 Office Action dated May 24, 2019 (13 total pages).

U.S. Appl. No. 16/528,362 Final Office Action dated Aug. 31, 2021 (16 total pages).

U.S. Appl. No. 16/528,362 Office Action dated Apr. 23, 2021 (16 total pages).

International Preliminary Report on Patentability issued by International Bureau of WIPO dated Dec. 26, 2019 in International Patent Application No. PCT/US2018/038028 (7 total pages).

International Preliminary Report on Patentability issued by International Bureau of WIPO dated Mar. 5, 2020 in International Patent Application No. PCT/US2018/000307 (7 total pages).

International Search Report and Written Opinion, dated Sep. 4, 2018, for International Application No. PCT/US2018/038028 (10 pages).

Jia, W., et al., "Electrochemical Tattoo Biosensors for Real-Time Noninvasive Lactate Monitoring in Human Perspiration," Analytical Chemistry, vol. 85, pp. 6553-6560 (published Jul. 1, 2013).

Koh, Ahyeon, et al., "A soft, wearable microfluidic device for the capture, storage, and colorimetric sensing of sweat," Nov. 23, 2016, Science Translational Medicine, 8(366), https://stm.sciencemag.org/contenl/8/366/366ra165—Author Manuscript available in PMC May 23, 2017 (48 total pages) with Supplementary information and figures (Year: 2016).

Lei, Y., et al., "Microbial Biosensors," Analytica Chimica Acta vol. 568, pp. 200-210 (available online Jan. 18, 2006).

MacNab et al., "The Gradient-Sensing Mechanism in Bacterial Chemotaxis," Proc. Nat. Acad. Sci. 69(9): 2509-2512 (1972).

Martinez et al., "Three-dimensional microfluidic devices fabricated in layered paper and tape," PNAS 105(50): pp. 19606-19611, 2008.

No Author, "L'Oreal Debuts First-Ever Stretchable Electronic UV Monitor at the 2016 Consumer Electronics Show," (Jan. 6, 2016), last retrieved on Jul. 6, 2022 from https://www.loreal.com/en/press-release/research-and-innovation/loral-debuts-firstever-stretchable-electronic-uv-monitor-at-the-2016-consumer-electronics-show/ (4 total pages).

PCT Application No. PCT/US2018/016281 International Preliminary Report on Patentability dated Aug. 15, 2019 (6 total pages).

PCT Application No. PCT/US2018/016281 International Search Report and Written Opinion dated May 29, 2018 (8 total pages).

(56) References Cited

OTHER PUBLICATIONS

Prindle et al., "A sensing array of radically coupled genetic 'biopixels'," Nature, vol. 481, pp. 39-44, 2012 (13 pages).
Rothert, A., et al., "Whole-cell-reporter-gene-based biosensing systems on a compact disk microfluidics platform," Analytical Biochemistry, vol. 342:, pp. 11-19 (available online Dec. 7, 2004).
Su, L., et al., "Microbial biosensors: A review," Biosensors and Bioelectronics, vol. 26, pp. 1788-1799 (available online Sep. 15, 2010).

* cited by examiner

Figure 1. Representative Design of Pollution-Sensitive Applique
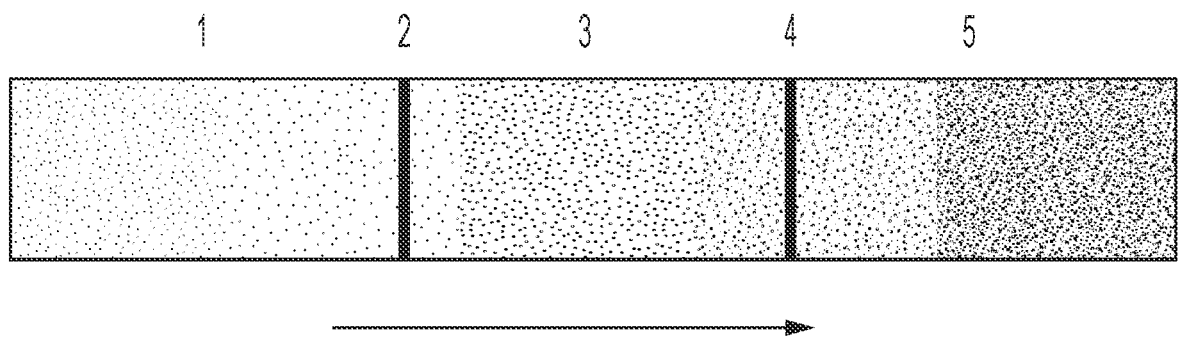

Figure 2. Stack-up of Applique
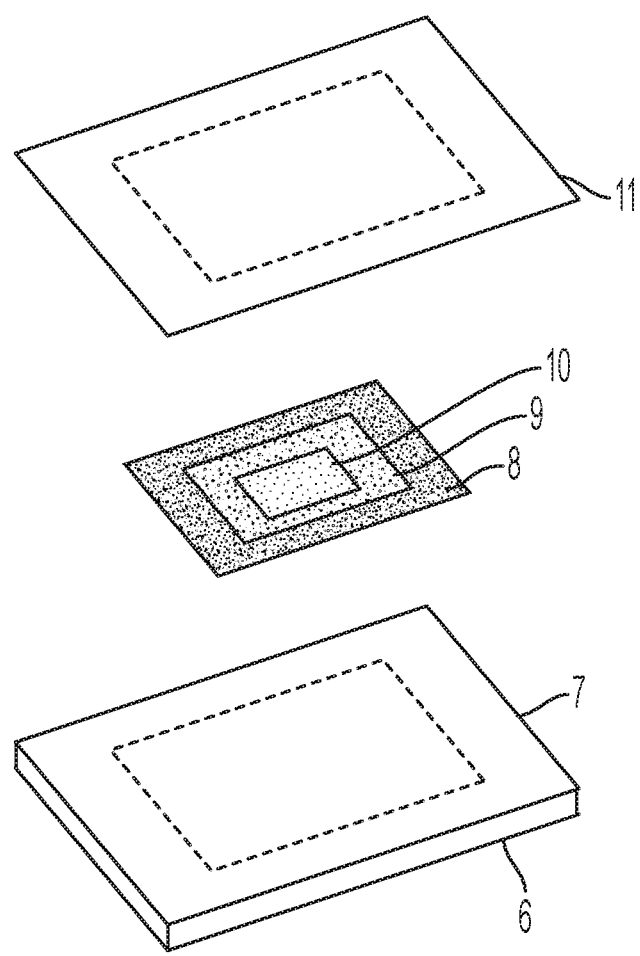

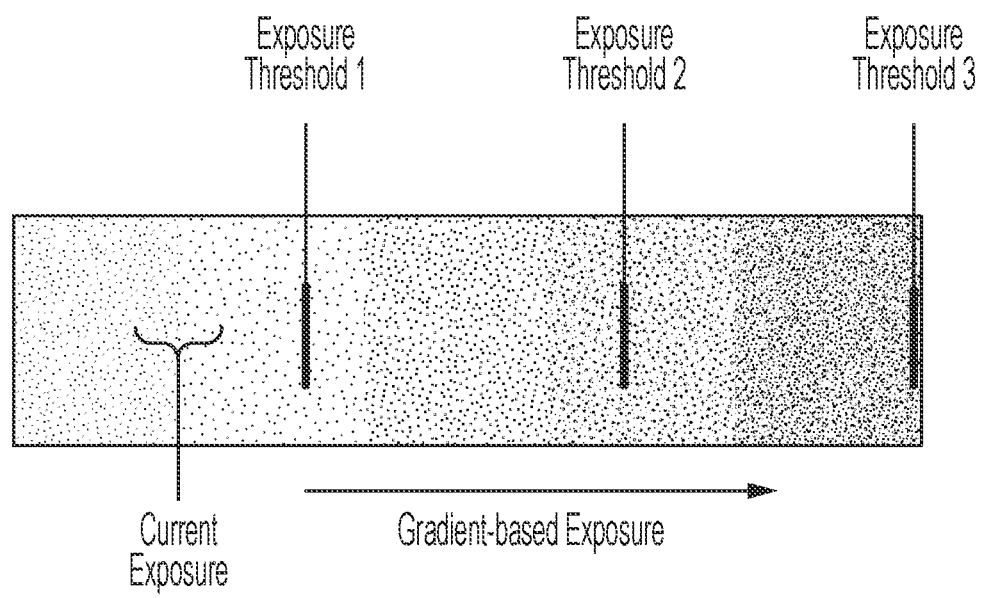
Figure 3. Gradient print artwork

Figure 4. Multiple indicator approach to colorimetric change
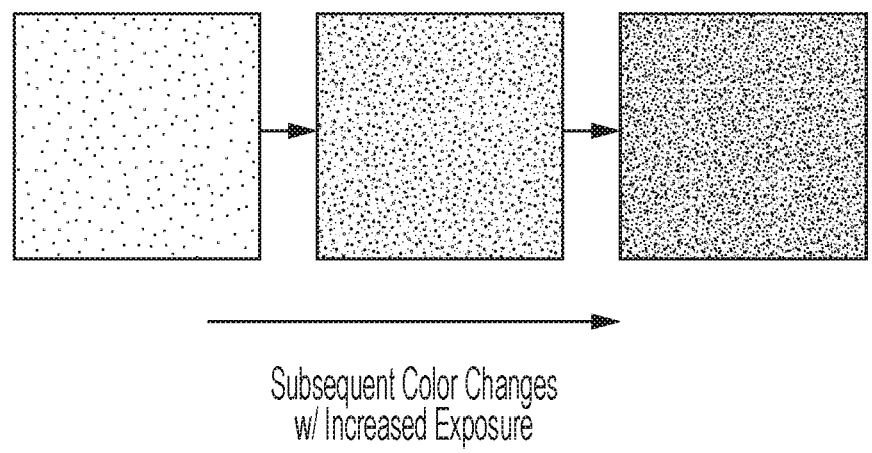
Subsequent Color Changes
w/ Increased Exposure

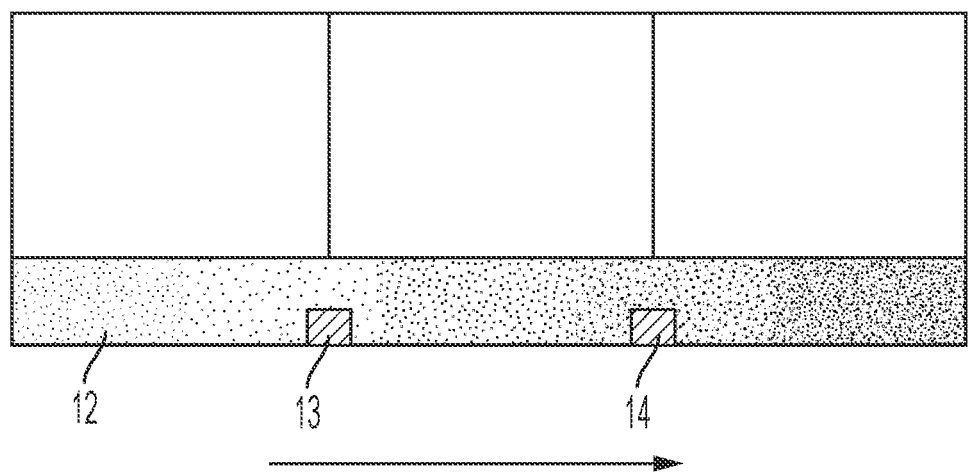
Figure 5. Use of fixed tint reference color

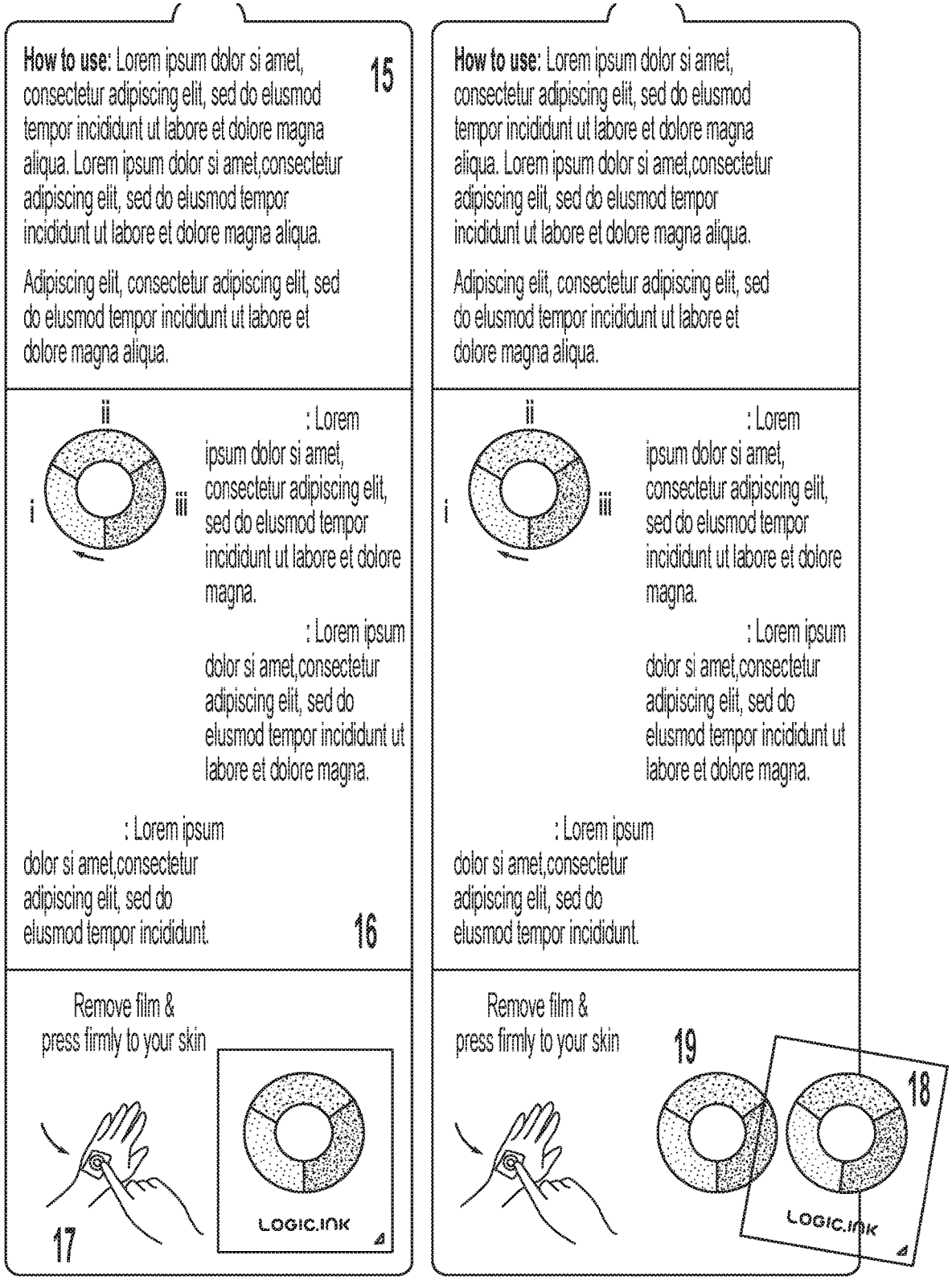
Figure 6. Packaging envelope

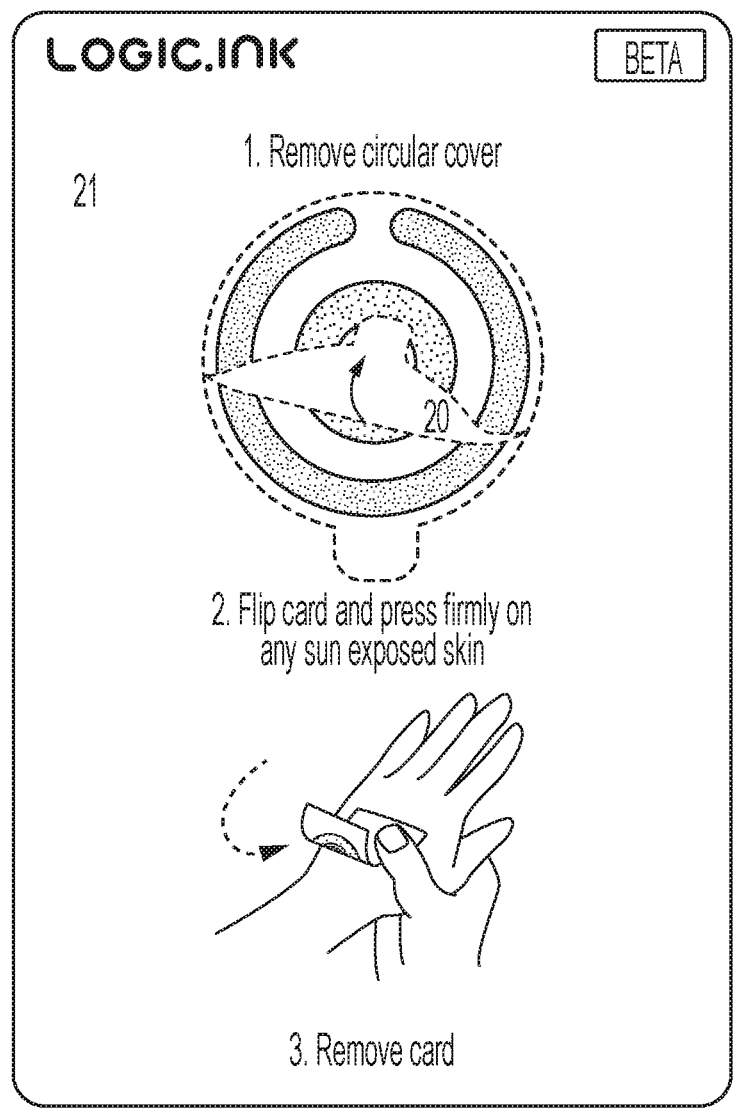
Figure 7. Application of the device

SENSING OF MARKERS FOR AIRBORNE PARTICULATE POLLUTION BY WEARABLE COLORIMETRY

CROSS REFERENCE TO RELATED APPLICATIONS

This application is a U.S. National Stage Application under 35 U.S.C. § 371 of International Patent Application No. PCT/US2018/000307, filed on Aug. 17, 2018, which claims priority to and the benefit of U.S. Provisional Application No. 62/546,860, filed Aug. 17, 2017, the entire contents of which are incorporated by reference herein.

INCORPORATION BY REFERENCE

All patents, patent applications, and publications cited herein are hereby incorporated by reference in their entirety in order to more fully describe the state of the art as known to those skilled therein as of the date of the invention described herein.

TECHNICAL FIELD

Described herein are wearable colorimetric indicators of the presence of airborne particulate pollution. In particular, this invention relates to qualitative colorimetric dose-responsive airborne particulate pollution indicators that are capable of providing cumulative dose information to their wearer.

BACKGROUND

There is a need for simple and readily understood, low-cost, wearable airborne particulate pollution sensors that can inform a user as to their accumulated exposure, without the required use of additional electronic devices. The purpose of such devices is atmospheric particulate exposure awareness education with the view to mitigate both dermatological effects and pulmonary system exposure. There have been attempts to commercialize keychain or belt-worn electronic devices that inform a user as to their instantaneous exposure to PM2.5 airborne particulate matter, which are capable of time-based integration to provide cumulative exposure data. See e.g., https://www.tzoa.com/products/ and http://www-.dailycal.org/2014/11/24/uc-berkeley-undergrads-developing-wearable-air-pollution-monitor/.

Such devices are based on light scattering by the particulates, and are designed to report via Bluetooth communications to a smart phone application. Being somewhat cumbersome, they are not thought to have achieved a great level of success.

SUMMARY

The present invention provides a simple 2-dimensional daily use colorimetric applique, which has the needed advantages of convenience, potential low cost, and the ultimate in simplicity.

The device is an electronics-free skin-wearable applique, which incorporates artwork that is in some cases similar to that of a temporary tattoo. The graphics present an easy to understand interface for the user's interpretation of the sensor data. Artwork is applied to a substrate film, isolating it from the skin, which renders the form factor that of an applique or sticker. The device can inform users of their accumulated exposure to atmospheric particulates and can serve as a marker for other forms of atmospheric pollution that can be correlated to the particulates present. The qualitative guidance on one's particulate pollution exposure provided by the device can be read with the unaided eye, though more specific information can be provided by reading its color changes with the aid of the camera of a smartphone or other device via a companion application. The ink chemistry correlates to airborne particulates that are to a great extent composed of inorganics from combustion or other types of high temperature processes. These inorganics typically contain metal oxides, which can be used as markers for the presence of additional inorganics and such organics as carried by, or along with, airborne particulate pollution (such as polyaromatic hydrocarbons).

Ink chemistry is herein described which takes advantage of the reactivity of the oxides of multi-valent transition metals to create the colorimetric sensing employed in the indicators disclosed herein. A key challenge is that airborne particulates may be present at very low levels, ppm if not ppb, and thus obtaining a color change visible to the unaided eye is difficult in the absence of a catalytic (or amplification) mechanism involving the substances present. In accordance with certain aspects, multivalent transition metal ions derived from the oxides present participate in a homogeneous catalytic cycle designed to amplify their effect. The chemistry generates an ionic cycle that cycles the metal oxide through different oxidation states, while generating a catalyst reaction product that produces a visually detectable indicator, or that is detectable using other monitoring methods, e.g., ultraviolet irradiation, electrochemical monitoring and the like.

In one aspect of the invention, a colorimetric signal is generated by the approximately linear catalytic decomposition of a per-compound having a high oxidation potential at a rate proportional to the amount of solubilized incident multi-valent transition metal oxide material. Color change visible to the unassisted eye is produced by single or multiple redox indicator dyes which change color as the per-compound is decomposed. The endpoint of the color change may be controlled by the amount of per-compound initially present.

The colorimetric airborne pollution sensor can be provided in the form of a film applique to skin, clothing, or other locations of a user's choosing, that, through color change, indicates one's cumulative exposure to airborne particulate pollution. The purpose of the device is to provide a qualitative basis for decision making on controlling one's exposure to atmospheric particulates through either covering exposed skin, limiting exertion, or removing oneself from the affected outdoor environment entirely.

In accordance with one aspect, the present application is directed to a wearable pollutant indicator comprising a polymeric film substrate having a first side and a second side, an adhesive disposed on the first side of the substrate, and a readily understood user interface disposed on the second side of the substrate, wherein the user interface comprises a qualitative indicator. The qualitative indicator provides a qualitative indication of the accumulated exposure to incident airborne particulate pollution as sensed through the reaction of the transition metal oxides therein. In certain embodiments, the wearable pollutant indicator is wearable for the skin.

In some aspects, the polymeric film substrate may be a polymer such as polydimethylsiloxane, thermoplastic polyurethane, thermoplastic elastomer, polyethylene, or polyethylene terephthalate.

The wearable pollutant indicator typically includes a redox indicator, which produces a color change in the presence of a decomposed per-compound. Examples of useful per-compounds include, but are not limited to, carbamide peroxide (hydrogen peroxide complexed with urea), sodium perborate, sodium persulfate, sodium percarbonate and combinations thereof. Examples of useful redox indicators include, but are not limited to indigo carmine, 2,2'-bipyridine, ferroin, diphenylamine, viologen, methylene blue, safranin and combinations thereof.

The qualitative indicator of the wearable pollutant indicator described herein may also include a complexation agent to facilitate dissolution of incident transition metal oxides and/or a reducing agent, which is kinetically stable in the presence of the per-compound and is capable of rapidly reducing the upper state of the transition metal oxide to a lower state. Examples of useful reducing agents include, but are not limited to, ascorbic acid, fructose, glucose, lactose, galactose, sodium sulfite and combinations thereof.

In accordance with certain aspects, the qualitative indicator includes an ink or gel base. Examples of which include, but are not limited to, carboxymethyl cellulose, carboxyethyl cellulose, hydroxyethyl cellulose, methyl cellulose, hydroxypropyl methylcellulose, gum arabic, dextrin, waterborne latex dispersions, waterborne polyurethane dispersion, and combinations thereof. In certain embodiments, the ink or gel base may be crosslinked.

In accordance with certain aspects, the wearable pollutant indicator may include an underprint under the qualitative indicator.

In accordance with certain aspects, the qualitative indicator also includes fixed-tint calibration markers and/or fixed-tint reference colors to allow for more fine-tuned interpretation of the color change and signal provided to users.

In accordance with certain aspects, the wearable pollutant indicator includes a superstrate material disposed over the user interface thereby sandwiching the user interface between the substrate and superstrate. The superstrate material may be a porous polymeric film, woven mesh or non-woven mat. Examples of useful superstrate materials include, but are not limited to, polyethylene, nylon, polyester, cotton, and combinations thereof. In some cases, the superstrate material may be in either woven or non-woven form.

In accordance with certain aspects, the qualitative indicator includes discrete segments of artwork of different formulation or artwork of that employs gradient formulations.

In accordance with certain aspects, the qualitative indicator includes a gradient of per-compound.

In accordance with certain aspects, the qualitative indicator provides a two dimensional colorimetric output which may be read by either a human being or by a computer vision algorithm.

In accordance with certain aspects, no reference color is provided on the wearable pollutant indicator. In some cases, only one reference color in total is provided on the wearable pollutant indicator.

In accordance with another embodiment, a sensor containing an analyte sensing composition is disclosed. In accordance with certain aspects, the analyte sensing composition includes a metal oxide reducing compound, a per-compound, and a redox indicator dye, wherein the analyte sensing composition is disposed in arbitrary design upon a polymeric film substrate, which is impermeable to the analyte sensing composition, and wherein the sensor provides a visual transition from a first visual state to a second visual state on exposure to the analyte. In accordance with certain aspects, the analyte sensing composition also includes a metal ion complexing agent. In certain cases, the analyte is a metal oxide. In more particular cases, the metal oxide is cycled between oxidation states to generate a catalyst reaction product that produces a visual indicator.

In accordance with yet another embodiment, a sensor system comprising the sensor disclosed herein and a computer vision application is described. The vision application may read a transformation of an absolute colorimetric readout to a relative change in color along a geometry under different lighting conditions. In other cases, the vision application reads a transformation of an absolute colorimetric readout to a relative change in color along a geometry with non-uniform shading.

In accordance with yet another embodiment, a method of monitoring pollutant exposure is provided. The method in one aspect includes applying the wearable pollutant indicator disclosed herein to a user's skin or clothing.

In accordance with yet another embodiment, a method of making a wearable pollutant indicator is disclosed. In one aspect, the method includes applying an adhesive to a first side of a substrate, applying an analyte sensing composition to the second side of the substrate, wherein the analyte sensing composition is disposed in arbitrary design upon the film substrate, which is impermeable to the analyte sensing composition, and wherein the analyte sensing composition provides a visual transition from a first visual state to a second visual stale on exposure to the analyte. In one aspect, the analyte sensing composition includes a metal oxide reducing compound, a per-compound, and a redox indicator dye.

BRIEF DESCRIPTION OF THE DRAWINGS

FIG. 1 is a representative design of a wearable pollutant sensor in accordance with one aspect of the present invention;

FIG. 2 shows an exploded view of a wearable pollutant sensor in accordance with one aspect showing the construction of the sensor;

FIG. 3 provides a representative design of a wearable pollutant sensor in accordance with another aspect of the present invention;

FIG. 4 provides a representative design of a wearable sensor in accordance with yet another aspect of the present invention;

FIG. 5 illustrates a representative design of a wearable sensor including fixed tint reference colors in accordance with yet another aspect of the present invention;

FIG. 6 illustrates an example of a packaging envelope and instructions in accordance with one aspect of the present application; and FIG. 7 provides sample instructions for applying the device in accordance with one aspect of the present application.

DETAILED DESCRIPTION

1. The Chemistry Employed in the Invention

The sensor is described with reference to FIG. 1, which is presented for the purpose of illustration only and is not intended to be limiting.

1a. General Explanation of FIG. 1

The applique shown in FIG. 1 is meant to convey increasing exposure as its multiplicity of segments sequentially activate. It is understood that the user interface presented by the artwork is arbitrary, and that there are many possible designs by which to convey to the user qualitative information on his or her exposure to airborne particulate pollution, including the option of artwork with only a single pollution sensitive segment. Preferably though, the device is set up as a ladder of segments. The applique of FIG. 1 displays this ladder as Segments 1, 3, and 5, which change color in order of increasing incident transition metal oxide. These segments can be calibrated to a known standards of pollution exposure, e.g., to levels defined by the Air Pollution Index (API), the Pollutant Standards Index (PSI), or the Air Quality Index (AQI), among others. See e.g., https://airnow.gov/index.cfm?action=airnow.international. Segments 2 and 4 include fixed tint reference colors. For example, should the sensing Segment 3 reach the same color as reference color 4, the wearer will know he or she has been exposed to pollution particulates in an amount consistent with the calibration of the segment. The sequential activation of these segments allows the user to be aware of the amount of airborne pollution he or she has been exposed to and provides the ability to alter his or her exposure based on the presumed dangers of the respective levels.

1b. Chemistry Sensitive to Transition Metal Oxides

The colorimetric sensing compound(s) can be applied to substrate materials in the form of waterborne inks or gels. The chemistry used herein can be formulated for printing by screen and flexo methods, and, in the case of the gradient printing, discussed below, by stencil or ink-jet methods. In accordance with certain embodiments, the chemistry may be printed by commercial printing facilities, which have become tightly regulated on volatile organic carbon (VOC) emissions. In particular embodiments, the chemical constituents can be in a waterborne formulation using components generally accepted as safe.

On the basis of transition metal oxides being a well-known constituent of airborne particulate pollution, likely formed in high temperature processes (the combustion of coal, for instance), the chemistry starts with transforming the speciation of the transition metals present from oxide to ionic. Among the metals known to be in such airborne particulate material are the multivalent metals iron (Fe), manganese (Mn), chromium (Cr), molybdenum (Mo), vanadium, (V), copper (Cu), and nickel (Ni). Their oxides are assumed to be in the highest valency state of the metal. These oxides can serve as a proxy for other inorganics in soot and ash such as silica, silicates, aluminates, aluminosilicates, uncombusted carbon and carbonaceous materials, and the like, which are less accessible to colorimetric chemistry schemes. They can also serve as a proxy for other contaminants in soot and ash such as: lead (Pb), cadmium (Cd), and absorbed polyaromatics. Many of the above metal oxides are commonly present in air pollution, particularly in China. One aspect of the present application is to provide devices and methods for qualitatively assessing these compounds. Characterizations of representative air pollution particulates are described in various references, such as Heller-Zeisler et al., *Biol. Trace Elem. Res.* 1999, 71, 1, 195-202 and Sun, G et al., *Atmospheric and Climate Sciences,* 2013, 3, 100-110. Samples of such particulate materials are available from the U.S. National Institute of Science and Technology (Washington, D.C.). See https://www-s.nist.gov/srmors/.

1c. Dissolution and Complexation

In one or more embodiments, the particulate sensor includes reducing agents to reduce airborne metal oxides to metal ions. Though the aforementioned oxides can be dissolved in strong acid, benign chemistry compatible with products to be handled (and mis-handled) by consumers is generally preferred. As such, advantage is taken of the well-known reaction between ascorbic acid and the higher valency state oxides of many transition metals. Ascorbic acid acts as a reductant for the higher valency state of multi-valent transition metal ions and shows little in the way of kinetic barriers. The so-called "reducing sugars," fructose, glucose, lactose, and galactose, are also capable of performing the role of ascorbic acid if present in the ink or gel formulations in gross excess versus the multi-valent transition metal oxide analytes.

In one or more embodiments, the particulate sensor includes a complexing agent. Species may be simultaneously present with which to complex and better solubilize the resulting metal ions and modify their reactivity with respect to subsequent reactions. Suitable complexing agents include metal chelating agents such as polyvalent organic acids and amines, such as ethylene diamine, citric acid and oxalic acid. Oxalic acid produces oxalate complexes of the metal ions present following the dissolution of the metal oxides. By adjusting the concentrations of these components as well as the reducing agents, the sensitivity of the device can be changed because the metal oxides can be made to have a higher rate of solubilizing into the sensing composition.

Oxalic acid has been discovered to be advantageous in the formulations invented for several reasons: 1) oxalic acid lowers the pH, which is favorable for transition metal oxide dissolution, 2) oxalic acid chelates many transition metal ions rendering the homogeneous catalytic cycle (to be discussed below) much slower such that the apparent rate of colorimetric change becomes more dependent on the accumulated amount of incident metal oxide, and 3) the pH change associated with the addition of oxalic acid to the formulations prevents the oxidation of ascorbic acid by the per-compound (thus providing for the gradual disappearance of the per-compound solely due to incident metal oxide). The latter reason was unexpected and fortuitous.

Ascorbic acid and oxalic acid are kinetically stable in the presence of selected per-compounds, which are involved in the subsequent step of the colorimetric chemistry disclosed herein. Of the possible such kinetically stable reductants used to accelerate the metal ion catalytic cycle, ascorbic acid is particularly useful in accordance with certain representative formulations, followed by "reducing sugars" such as fructose, glucose, lactose, and galactose.

1d. Homogeneous Catalysis of Per-Compound Decomposition

In their dissolved and complexed state, transition metal ions are available to participate in the homogeneous shuttle catalysis. An ink or gel may be formulated which contains an arbitrary amount of a per-compound (the term meaning a compound containing an oxygen-oxygen single bond), which, if undisturbed, keeps a judiciously selected pH insensitive redox indicator in its upper (oxidized) and intensely colored state. However, in the presence of dissolved ions of certain multivalent transition metal oxides capable of entering into cyclic shuttle between upper and lower oxidation states, a judiciously selected per-compound can progressively be decomposed to the point that it can no longer hold the pH insensitive redox indicator in its upper (oxidized) intensely colored state. This scheme allows a very small amount of incident airborne transition metal oxide particulate pollutant to produce a colorimetric change visible to the unaided eye.

Using the ferric/ferrous cycle as an example, and, for simplicity, hydrogen peroxide as the per-compound, the desired homogeneous catalysis may be expressed as:

Chain initiation: $Fe^{3+}+H_2O_2 \rightleftarrows [Fe^{III}OOH]^{2+}+H^+$
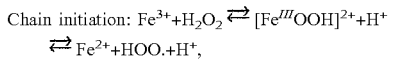
$\rightleftarrows Fe^{2+}+HOO.+H^+$, Chain propagation: $Fe^{2+}+H_2O_2 \rightarrow Fe^{3+}+2\ OH.,\ Fe^{3+}+H_2O_2+OH. \rightarrow Fe^{3+}+HOO.+H_2O \rightarrow Fe^{2+}+H^++O_2+H_2O$.
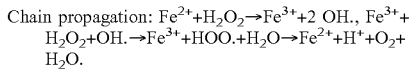

The multi-valent metals that can potentially engage in such chemistry are: Fe, Mn, Cr, Mo, V, Cu, and Ni. The lower oxidation states of each are likely reacted to their upper oxidation state by per-compounds regardless of their complexation (of course, kinetic factors could mitigate this in a number of cases).

It will be noted that reductants, such as ascorbic acid and the "reducing sugars", are able to accelerate the desired shuttle by reducing the metal ion in its upper oxidation state to its lower oxidation state. The reactive lower oxidation state is then immediately available to engage (again) in the decomposition of the per-compound. The presence of ascorbic acid or other reductant in the ink formulations is likely to be able to reduce the higher oxidation state of the majority of the above metals regardless of complexation. The amount of reductant used can be different in different regions of artwork, or applied as a gradient, such that progressive change occurs over time in the presence of the multivalent metal oxides present in airborne particulate atmospheric pollution.

In accordance with particularly useful embodiments, perborate is used as the per-compound on the basis of its relative shelf life stability and rapid kinetics in the reaction sequence of this invention. Fortuitously and unexpectedly, in the absence of the intended homogeneous catalysis, ascorbic acid and oxalic acid are kinetically stable in the presence of perborate, a key feature making the colorimetric chemistry invented practical for use in inks and gels and such inks and gels being practical for printing the artwork of the colorimetric appliques disclosed herein.

The most readily available and safe per-compounds include, but are not limited to, hydrogen peroxide, carbamide peroxide (hydrogen peroxide complexed with urea), sodium perborate, sodium persulfate, and sodium percarbonate. Sodium perborate is particularly useful in accordance with certain embodiments of the sensor formulation. The per-compounds of alternative metal ions may also be useful. The amount of per-compound used, or, as will be described below, the variation of the concentration of other constituents that control the reaction kinetics, can be different in different regions of art work such that progressive change occurs over time with the continued incidence of the multivalent metal oxides present in airborne particulate atmospheric pollution.

1e. Indicator Dyes and Color Enhancement

Indicator dyes are used to provide a colorimetric change corresponding to the relative amount of per-compound present. These dyes change color based on the redox potential of their environment. In accordance with one, indigo carmine can be used as a single redox dye. Indigo carmine progresses from a bright blue in its oxidized state to a nearly clear pale yellow as per-compound is decomposed by the homogeneous catalytic cycle of sensing composition disclosed herein. The color change takes place at redox potential of about +0.4 V. Examples of other redox dyes that may be used include, but are not limited to, 2,2'-bipyridine, ferroin, diphenylamine, viologen, methylene blue, and safranin. Combinations of dyes can also be used. The selection of the redox dye depends on the redox potential in the presence of the targeted amount of per-compound and the redox potential when the per-compound is exhausted by the catalytic cycle.

As noted above, indigo carmine, which changes from a bright blue in its oxidized state to a near colorless weak yellow state when the arbitrary amount of perborate present is fully decomposed is a particularly useful dye. Assuming there is sufficient oxalic acid present to complex all solubilized incident multivalent transition metals, the time span over which the device functions can be set by the amount of per-compound present (the reservoir of highly oxidizing per-compound keeping the redox indicator in its upper oxidation potential state). In accordance with one embodiment, the device can provide for a color change upon exposure to the elevated levels of pollution, such as that on certain days on the streets of Beijing, over the course of several hours. The amount of perborate present being entirely arbitrary, inks or gels may be formulated with different levels such that artwork may be designed wherein segments change color at different times in response to increasing amounts of incident metal oxide. Indeed, gradients of perborate concentrations may also be printed (however, necessitating multiple printing steps, as is more fully described below), which will produce a moving front of color change over time and exposure to multi-valent transition metal oxide.

Of many possible complexation agents with which to promote the dissolution of metal ions in aqueous media, oxalic acid is particularly useful. Other metal chelating agents can also be used. Among organic acids that are effective complexation agents, oxalic acid and citric acid are particularly useful. These compounds form stable complexes with transition metal ions. Among diamines that are effective, ethylenediamine tetraacetic acid (EDTA) is a particularly useful and effective complexation agent for enhancing the aqueous solubility of transition metal ions.

The choice of indicator dyes in the presence of underprints, which are under layers of fixed tint color printed underneath the main artwork, allows for aesthetically appealing brighter colors or higher contrast color changes. In accordance with one embodiment, fixed tint under-prints of a slight blue may be used such that when the perborate is fully decomposed the applique may assume a neutral gray, which is generally regarded as more pleasing than the weak yellow color space, which generally imparts to goods the connotation of low quality.

1f. Base Media for the Chemistry

Other ink or gel constituents can be included in the pollution monitor applique. Among these are the base and vehicle for the ink, anti-drying agents, and stabilizers, if any.

The base media can be a water soluble material that allows the ink created to be applied, e.g., printed, screened, sprayed, etc., using VOC-restricted printing operations. Of plausible candidates, the choice of base media for certain embodiments are water-borne cellulosic materials such as carboxymethyl cellulose (CMC), hydroxyl ethyl cellulose (HEC), and combinations thereof. For improved devices, a degree of cross-linking will prove advantageous for purposes of improving water resistance of the appliques. For this purpose, additions of citric acid promote cross-linking of the cellulose chains at the point of their hydroxyl substituents. See e.g., Demitri, C., et al. *J. Appl. Polym. Sci.*

2008, 2453-2460. Similarly, polyamine wet strength resins (such as the Kymene™ series of resins from Solenis Corporation (Wilmington, Del.)) can also be used for such purposes.

To achieve improved water resistance, alternative ink vehicles are also useful such as waterborne latex and waterborne polyurethane dispersions.

In the case that greater film builds are desired, for instance to have a greater thickness over which to develop visible color, gels, potentially cross-linked as described above, may be applied and worked into woven and non-woven synthetic polymeric or natural materials such as, respectively and for example, woven polypropylene or non-woven mat, or cotton cloth of various weaves or non-woven felts. These materials, which may be thought of as three-dimensional anchors for the gels, would be adhered to non-porous substrates, just as in the case if the colorimetric chemistry is applied as inks.

An anti-drying agent may be useful in order to keep the chemistry moist over the period of its intended use, typically daily but could be used for longer or shorter periods. The anti-drying agent may also allow for the solubilizing and complexing agents to better introduce metal ions from the impinging metal oxides into the device. This measure may also increase sensitivity. Of the plausible candidates, glycerol is a particularly useful anti-drying agent. Other suitable anti-drying agents include ethylene glycol and propylene glycol.

If needed, stabilizers such as hindered amine light stabilizers (HALS) may be added to address the protection of the indicator dyes or other constituents from any adverse effect of solar ultraviolet radiation.

2. General Construction of the Device

In one embodiment, the device can be a printed stack-up as shown in FIG. 2.

2a. General Explanation of FIG. 2

Applied as an ink in this embodiment, the applique is comprised of four layers. From bottom up, there is an adhesive 6 attached to a printable substrate 7. The adhesive layer can be protected before application in use by a peel-able carrier film (not shown). For devices intended to be worn on skin this adhesive is medically graded. Substrate polymers may be silicone, plastic, or elastomer based. A thermoplastic polyurethane (TPU) that has a low modulus and therefore conforms very well to the skin, providing comfort and ease of wear, even for multiple days is a particularly useful substrate. Inks 8, 9, and 10 are printed on top of the substrate before being overlain with the final layer—a permeable superstrate matrix 11, which serves to, to the extent possible, protect the artwork from damage from abrasion. Each ink is formulated to provide sensitivity to differing amounts of incident transition metal oxide. Artwork may be applied in any arbitrary design, and similarly to that shown in FIG. 1, that shown in FIG. 2 is not meant to be limiting.

2b. Film Substrate 7

In certain embodiments, polydimethyl siloxane (PDMS) and thermoplastic polyurethane (TPU) are particularly useful as the substrate film 7, on the basis of their extreme flexibility and, in the case of PDMS, its oxygen and water vapor permeability, which is beneficial to achieving a comfortable feeling when applied to skin for long periods of time. The preferred thickness is in the range of about 1 to 6 thousandths of an inch, more particularly about 3 to 5 thousandths of an inch.

Commercial polymers available in films may be also be used as substrates in accordance with certain aspects. Examples of useful polymers include, but are not limited to, polydimethylsiloxane (PDMS) available from Bluestar Silicones (East Brunswick, N.J.), Gel-Pak (Hayward, Calif.), Wacker (Adrian, Mich.), or Dow Corning (Midland, Mich.), and thermoplastic polyurethane (TPU), as available from American Polyfilm (Branford, Conn.) or Huntsman (Freeport, Tex.), or thermoplastic elastomer (TPE) as available from Gel-Pak or PolyOne (Avon Lake, Ohio), may be used. Use of such barrier materials serves to isolate the skin of an end user from the various inks used in the artwork.

Through each of the steps of its processing, the substrate film 7 is to be adhered with an adhesive 6 to a peel-able disposable carrier film such as polyethylene terephthalate (PET) or polycarbonate (PC). Such a carrier film is desired for both protection of the substrate film and the resultant device and to facilitate transfers in printing onto the substrate film if in either in sheet format or in web-based (roll-to-roll) printing operations.

2c. Adhesives on the Obverse Side of the Substrate 6

An adhesive 6 is applied to the obverse side of the substrate film and is used to adhere the applique optionally either to skin (in which case, a medically graded adhesive is used), clothing, or articles carried by the end user. A safe and effective adhesive can be selected from either commercial acrylic-based or commercial silicone-based chemistries. Examples of useful adhesives are available from Adhesives Research, Inc. (Glen Rock, Pa.) or Lohmann Technologies (Hebron, Ky.), respectively.

2d. Printing the Substrate with the Chemistry 8-10

Prior to printing, an air plasma or corona pretreatment may optionally be used to enhance the wetting and adhesion of the inks to the substrate polymer.

The colorimetric chemistry disclosed herein may be in the form of an ink or gel, comprising in the main of the ink base, reducing agent, complexation agent, redox dye, and per-compound. Optionally, stabilizers, such as antioxidants, may be added to increase shelf life of the ink or gel. As an example, one possible combination of chemistry is to use 4-6 wt. % aqueous carboxymethyl cellulose (CMC) ink base (CMC powder as available from CK Products, Fort Wayne, Ind.) along with 2-10 wt % ascorbic acid, 0.5-5 wt. % oxalic acid, 0.005-0.1 wt. % indigo carmine, and 0.5-2 wt. % perborate (all sourced from Sigma Aldrich Corporation, Milwaukee, Wis.). The ink is printed in such an amount (as determined by concentration and thickness) that it activates progressively from an intense blue to a light yellow/gray after exposure to multi-valent transition metal oxide particulates. Staged color changes may optionally be achieved by the addition of multiple redox dyes in order to give multiple color changes prior to the consumption all available per-compound. This approach would be useful as a means of indicating the accumulation of multi-valent transition metal oxide exposure. The addition of a red redox dye whose transition potential lies below that of the indigo carmine dye would create a multi-fold color change such as purple to red to gray.

After printing of any given layer, an ambient air or a thermally or infrared enhanced drying or tackifying step is anticipated prior to subsequent printing or the lamination of the permeable superstrate and possible re-moistening with one of the anti-drying additives discussed above.

2e. The Option of Under-Prints

Under-prints between substrate 7 and inks 8, 9, and 10 may be used to enhance either contrast between features of the artwork or the brightness of the colors of the active inks.

Such under-prints may be either white to increase color brightness or colored to enhance the contrast of the initial and activated colors. Such under-prints may also be printed in a gradient to increase color brightness or enhance contrast. The efficacy of these under-prints is determined by the concentration of their pigments or dyes and the thicknesses applied. Under-prints may also be used to provide a light blue color which, when the redox dye is in its reduced state, can balance its pale yellow color to produce a more aesthetically pleasing light gray end state color.

2f. Superstrate Materials, 11

A superstrate material 11 may be used to protect the artwork from abrasion and may be either applied to the artwork by pressure bonding or by it being affixed to the substrate prior to application of the inks or gels. The superstrate material may be a highly porous film, or a woven mesh, or a non-woven mat typically in the thickness range of about 2-3 thousandths of an inch. The superstrate material is judiciously chosen from natural cloth or felt or polymer materials in the form of porous materials, woven mesh, or nonwovens mats. These can function both to contain the colorimetric ink and to protect it from abrasion. A wide variety of materials will work for this purpose and may be selected from olefins, nylons, polyesters, cellulosics, and the like.

3. Design Options

To convey further information as to exposure to atmospheric pollution, further design options are discussed below.

3a. The Option of Gradient Prints

An option is to design artwork using a gradient of chemistry so as to set up a progressive growth in coloration (for instance, along a linear or circular strip of artwork) in proportion to the amount of incident metal oxide. Thus, a moving zone of color change is created that, for instance, advances linearly along the artwork as metal oxide accumulation increases. A non-limiting example is shown for illustration purposes in FIG. 3.

Assuming sufficient ascorbic acid and complexation agent, oxalic acid, is present to solubilize metal oxide, to create the gradient effect described above, the per-compound can be printed in a gradient of concentration over a print of the balance of the formulation. The over-print will diffuse into the underlying print to create the gradient formulation desired. Ink jet or stencil printing techniques may be used for the purposes of deposition of the gradient chemistry. Threshold markers calibrated to a pollution index will serve to convey to the user what his or her level of exposure is.

3b. The Option of Multiple Color Changes

Another option is to design artwork with an ink or inks containing multiple redox indicators so as to set up a laddered colorimetric change wherein each color of the ladder represents increasing exposure to incident transition metal oxide.

Rather than having multiple prints with a varying concentration of complexation agent, the multiple indicator approach will have an initial state capable of achieving a cumulative readout by passing through multiple colors. Complexation agents will be necessary in order to control the rate of the reaction by limiting the availability of metal oxide participating in the catalytic redox cycle while the amount of per-compound present will determine the final redox potential end point and, thus, the final color state of the device. A non-limiting example is shown in FIG. 4.

3c. Optional Use of Reference Colors or Other Fixed Tint Markings 12, 13, and 14

Optionally, fixed tint reference colors printed from conventional inks may be incorporated into the artwork as shown in FIG. 5, meant to be a build on the artwork of FIG. 1. These, for instance, could be the initial color or the final color of the chemistry which 12 assumes. Such reference colors could be of use in either unassisted visual inspection or for reference by a smartphone camera app. The artwork may or may not also incorporate fixed tint markings 13 and 14 along gradient prints, if any, which would be indicative of the threshold limit corresponding to an exposure limit.

4. Examples

In accordance with one example, the ink was prepared using a cross linkable hydrogel base to have the advantage of improved water resistance in use. Cellulose-based gels were used as the ink base. Specifically, hydrogels cured from 1.5% CMC and 0.5% HEC in an aqueous solution of 10% citric acid are particularly useful to cross-link such gels. See Demitri, C., et al. The following active constituents were added to the hydrogel vehicle, the amounts given being their weight percent in the resultant final mixture: 5% ascorbic acid, 1% oxalic acid, 0.02% indigo carmine, and 1% sodium perborate tetrahydrate. Addition of 20% glycerol to this gel served to modify the gel in order to prevent dehydration over the period of its intended use, increase stability, and extend shelf life.

For improved printing, the active ingredients of the chemistry may be added into a thickener, e.g., carboxymethyl cellulose, or hydroxyethyl cellulose. This type of ink was prepared by dissolving in the concentrations of ascorbic acid, oxalic acid, indigo carmine, and sodium perborate tetrahydrate as given above in a 20% aqueous solution of glycerol. After mixing the foregoing to complete the final formulation, hydroxyethyl cellulose in the amount of 4% was dissolved in the mixture in order to thicken it to the consistency of an ink useful for screen-printing. To eliminate bubble and crater defects, the solution was degassed in a vacuum chamber prior to being screen printed onto plasma treated thermoplastic polyurethane (TPU) film.

Additional means of device preparation can involve the addition of the ink mixture upon or into an absorbent material, e.g.: cellulosic papers, woven natural fiber or polymeric cloths, natural fiber or polymeric nonwoven cloths. In such a case these materials would be adhered to a non-porous substrate film.

The efficacy of the above ink formulations was determined by the rate of producing the desired colorimetric change when exposed to coarse (PM10), fine (PM2.5), or ultrafine (PM0.1) ferric oxide particulates (sourced from Sigma Aldrich Corporation (Milwaukee, Wis.)). Efficacy was measured by the time to full colorimetric change. Testing was performed by airbrushing identical amounts of ferric oxide onto prints of varying formulation inside of a chamber using a Model 350 airbrush from Badger Air-Brush Co. (Franklin Park, Ill.). Estimations for concentrations were made based on the spray time of the airbrush (10 seconds at 1 mg/sec) and the volume of the chamber. From this a concentration of 90 ppm ferric oxide was calculated. The ink formulations were then preferentially ranked based on the time interval to each ink's full color change, as observed by means of time-lapse video recording.

5. Converting and Packaging

The finished devices may be supplied to the end user in individual impermeable envelopes to protect them from change prior to use. The purposes of said impermeable packaging include maintaining a constant humidity and excluding oxygen. A non-limiting example is shown for illustration purposes in FIG. 6. In one mode, this envelope contains three sections 15 through 17. Section 15 provides written instructions as to how to use the device. Section 16 provides visual instructions via an info-graphic detailing the functionality. Section 17 provides instructions as to how to remove the protective cover and apply the device to the skin.

Finished devices may be die-cut leaving an appropriate margin around the artwork. In such conversion, kiss-cuts may be made such that a tab 18 is left by which the user can remove the top protective cover film, thus exposing the adhesive used to adhere the device 19 where the user pleases.

Included in the packaging are instructions for the application of the device. While the device resembles a sticker in some ways, the design, packaging, and application allow for an experience similar to that of the application of a modern temporary tattoo. A non-limiting example is shown for illustration purposes in FIG. 7. In FIG. 7, the user removes a protective cover 20 from the device. They then take the card on which the device is mounted, 21, and flip the card over to apply the adhesive side of the device to their location of choosing. Once pressure is applied, the strength of the bond of the adhesive is such that removal of the card is possible leaving behind the device on the users' location of choosing. Unlike temporary tattoos, no water or holding of the device in place for a set period of time is necessary.

6. Computer Vision Reading of the Device

As described herein, the colors of the applique may either be read, and interpreted, by the user acting alone or with the aid of a camera application, which could be used in conjunction with a smartphone. The human eye is well-adapted to detecting and interpreting relative changes among colors, however, computer vision will be necessary to determine absolute changes in color, in so doing possibly extracting additional, or more accurate, information. Comparison against absolute changes in color is more complex in that the environment will affect the color being read. The type of lighting source, its intensity, and angle can affect the color being read. The computer vision application would be designed to assign meaning to a color by interpolating between internal references.

As an example, in the gradient artwork embodiment, reference colors can be printed on the applique, for instance, one each at the end of the path over which the color gradient is printed. The app will compare the color change between these reference colors and the contiguous colors to determine whether the applique is beginning to activate or approaching saturation, translating this to the appropriate caution.

The invention claimed is:

1. A wearable pollutant indicator comprising a polymeric film substrate having a first side and a second side, an adhesive disposed on the first side of the substrate, and a sensor disposed on the second side of the substrate, wherein the sensor comprises:
an analyte sensing composition comprising:
a metal oxide reducing compound;
a per-compound; and
a redox indicator dye, which produces a color change in the presence of a decomposed per-compound;
wherein the sensor comprises a qualitative indicator, said qualitative indicator provides a qualitative indication of the accumulated exposure to incident airborne particulate pollution as sensed through the reaction of the analyte sensing composition with transition metal oxides in the incident airborne particulate pollution.

2. The wearable pollutant indicator of claim 1, wherein the wearable pollutant indicator is wearable for the skin.

3. The wearable pollutant indicator of claim 1, wherein the polymeric film substrate comprises a polymer selected from the group consisting of polydimethylsiloxane, thermoplastic polyurethane, thermoplastic elastomer, polyethylene, and polyethylene terephthalate.

4. The wearable pollutant indicator of claim 1, wherein the per-compound is selected from the group consisting of carbamide peroxide (hydrogen peroxide complexed with urea), sodium perborate, sodium persulfate, sodium percarbonate and combinations thereof.

5. The wearable pollutant indicator of claim 1 wherein the redox indicator is selected from the group consisting of indigo carmine, 2,2'-bipyridine, ferroin, diphenylamine, viologen, methylene blue, safranin and combinations thereof.

6. The wearable pollutant indicator of claim 1, wherein the analyte sensing composition further comprises a complexation agent to facilitate dissolution of incident transition metal oxides.

7. The wearable pollutant indicator of claim 1, wherein the metal oxide reducing compound is kinetically stable in the presence of the per-compound and is capable of rapidly reducing the upper state of the transition metal oxide to a lower state.

8. The wearable pollutant indicator of claim 7, wherein the metal oxide reducing compound is selected from the group consisting of ascorbic acid, fructose, glucose, lactose, galactose, sodium sulfite and combinations thereof.

9. The wearable pollutant indicator of claim 1, wherein the analyte sensing composition comprises an ink or gel base selected from the group consisting of carboxymethyl cellulose, carboxyethyl cellulose, hydroxyethyl cellulose, methyl cellulose, hydroxypropyl methylcellulose, gum arabic, dextrin, waterborne latex dispersions, waterborne polyurethane dispersion, and combinations thereof.

10. The wearable pollutant indicator of claim 9, wherein the ink or gel base is crosslinked.

11. The wearable pollutant indicator of claim 1, further comprising an underprint under the qualitative indicator.

12. The wearable pollutant indicator of claim 1, wherein the qualitative indicator further comprises fixed-tint calibration markers.

13. The wearable pollutant indicator of claim 1, wherein the qualitative indicator further comprises fixed-tint reference colors to allow for more fine-tuned interpretation of the color change and signal provided to users.

14. The wearable pollutant indicator of claim 1, further comprising a superstrate material disposed over the analyte sensing composition thereby sandwiching the analyte sensing composition between the substrate and superstrate.

15. The wearable pollutant indicator of claim 14, wherein the superstrate material comprises a porous polymeric film, woven mesh or non-woven mat.

16. The wearable pollutant indicator of claim 15, wherein the superstrate material comprises a material selected from the group consisting of polyethylene, nylon, polyester, cotton, and combinations thereof.

17. The wearable pollutant indicator of claim 16 wherein the superstrate material is in either woven or non-woven form.

18. The wearable pollutant indicator of claim 1, wherein the qualitative indicator comprises discrete segments of artwork of different formulations or artwork that employs gradient formulations.

19. The wearable pollutant indicator of claim 1, wherein the qualitative indicator comprises a gradient of per-compound.

20. The wearable pollutant indicator of claim 1, wherein the qualitative indicator provides a two dimensional colorimetric output which may be read by either a human being or by a computer vision algorithm.

21. The wearable pollutant indicator of claim 20, wherein no reference color is provided on the wearable pollutant indicator.

22. The wearable pollutant indicator of claim 20, wherein only one reference color in total is provided on the wearable pollutant indicator.

* * * * *